UNITED STATES PATENT OFFICE.

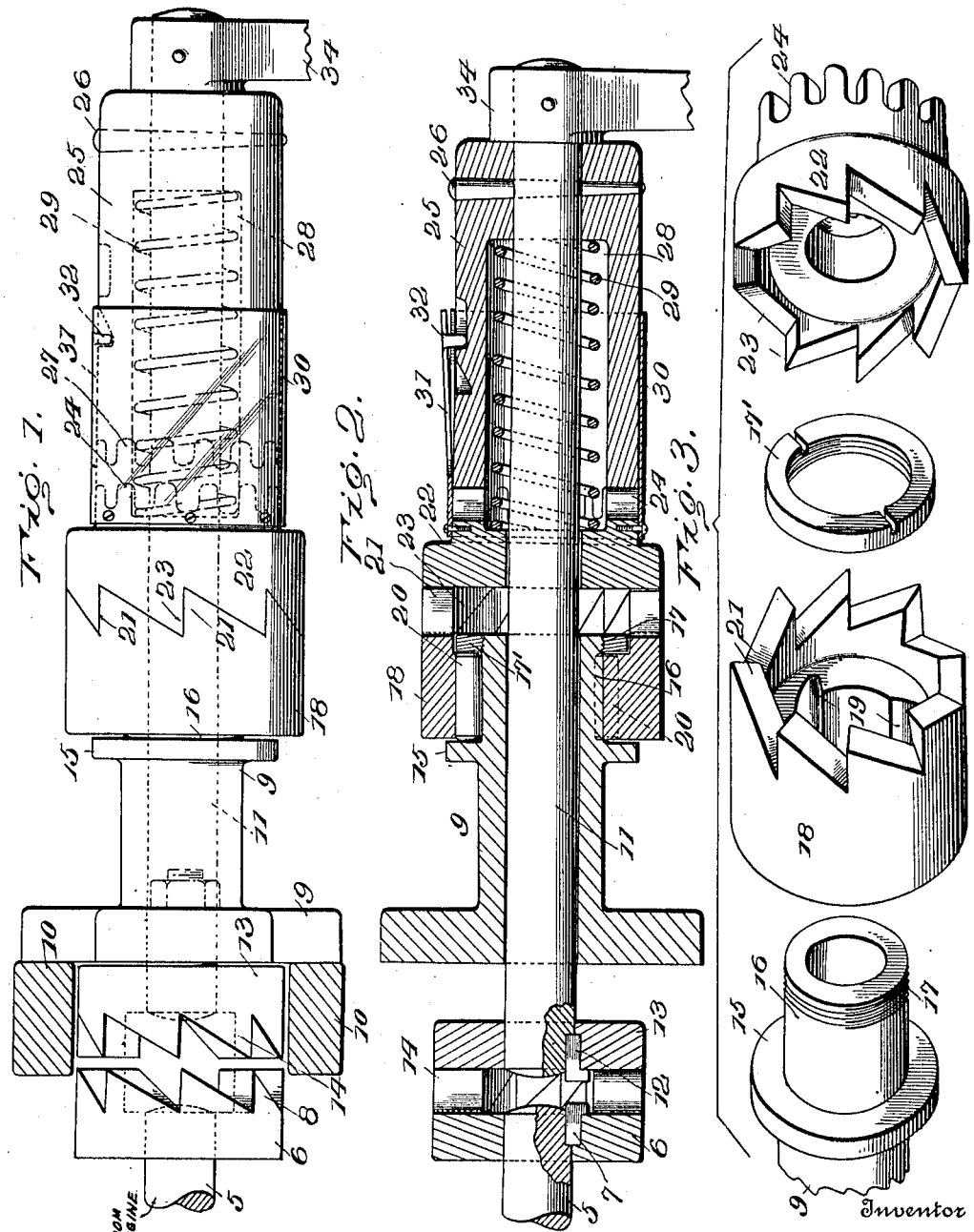

FRED DETTMAN, OF WEST DUNDEE, ILLINOIS.

STARTING MECHANISM FOR HYDROCARBON-ENGINES.

1,020,967. Specification of Letters Patent. Patented Mar. 26, 1912.

Application filed December 13, 1911. Serial No. 665,453.

*To all whom it may concern:*

Be it known that I, FRED DETTMAN, a citizen of the United States, residing at West Dundee, in the county of Kane and State of Illinois, have invented certain new and useful Improvements in Starting Mechanism for Hydrocarbon-Engines, of which the following is a specification.

My invention relates to certain new and useful improvements in starting mechanism for hydrocarbon engines, and is especially adapted for use as a safety starting crank for such engines when used in automobiles and the like.

The object of my invention is to provide a mechanism which will prevent the operator being injured should the charge in the engine be exploded prematurely, which causes the engine to start in a reverse direction and, with the form of crank commonly used, is liable to injure the operator.

With these and other objects in view my invention consists in certain constructions, combinations and arrangements of parts, the preferred form of which will be first described in connection with the accompanying drawings and then the invention particularly pointed out in the appended claim.

Referring to the drawings wherein the same part is designated by the same reference numeral wherever it occurs, Figure 1 is a side elevation of the mechanism; Fig. 2 is a central longitudinal section with the clutch members shown in engagement, and Fig. 3 is a view of parts of the device shown in separated relation to more clearly illustrate the invention.

5 designates one end of the engine shaft to which is secured a clutch member 6 by means of a key 7, the clutch member 6 being in the form of a collar provided on its outer face with an annular series of clutch teeth 8. Rotatably mounted in a bearing sleeve 9, carried by a portion of a frame 10, is the starting or cranking shaft 11. This shaft is disposed in endwise alinement with the engine shaft 5, and is capable of endwise bodily movement. Secured to the inner end of the shaft 11, as by means of a key 12, is a clutch member 13, in the form of a collar, and having an annular series of clutch teeth 14 adapted to coöperate with the clutch teeth 8 of the collar 6.

15 designates a ring or collar, preferably formed integral with the journal sleeve 9 intermediate its ends and forming beyond the same a bearing surface 16 which, at its end, is exteriorly threaded at 17.

18 designates a ring mounted upon the bearing portion 16, and provided upon its inner surface with the cut away cam faces 19, adapted to receive rollers 20, said rollers coöperating with the sleeve 9 to lock the ring from rotation in one direction while permitting the rotation of the ring in the opposite direction. The ring 18 is provided on its forward end with clutch teeth 21, said clutch teeth preferably being formed with one vertical side and one inclined side, as best shown in Figs. 1 and 3.

22 is a ring provided with teeth 23, adapted to coöperate with the teeth 21 of the ring 18, to lock the rings together when the ring 22 is rotated in one direction, which is the direction that the ring 18 is permitted to rotate by the rollers 20. The forward end of the ring 22 is preferably reduced in size and formed into a series of separated teeth 24, which preferably are of the form best shown in Fig. 1. The ring 22 is loosely mounted upon the shaft 11, so that it can have both rotary and longitudinal movement thereon.

25 is a collar fast on the shaft 11, the same being shown as secured thereon by means of the pin 26 passing through the collar and shaft. This collar at its rear end is provided with teeth 27, adapted to interlock with the teeth 24, whereby the ring 22 may be locked and caused to rotate with the shaft 11. The collar 25 is bored, as shown at 28, from its rear end for a portion of its length and the portion of the ring 22 carrying the teeth 24 is also bored out, and within these bores is seated a spring 29 surrounding the shaft 11 and normally tending to hold the teeth 24 and 27 out of engagement with each other, and the teeth 23 in engagement with the teeth 21. Preferably, and as shown, I provide a thin metal sleeve 30, secured at its rear end to the base of the reduced portion of the ring 22, said sleeve having a narrow section 31 cut therefrom for a portion of its length to form a spring, said spring 31 carrying in its outer end a pin 32 adapted when the teeth 27 of the collar 25 are disengaged from the teeth 24 to enter an inclined notch 33 in the collar 25. This notch 33 is formed on such portion of the collar as to hold the crank 34 fast on the shaft 11 in the desired position and prevent the same from swinging when the parts are in their normal position.

In Fig. 1 I have shown the parts in their normal position, that is to say the teeth 8 and 14 of the clutch rings 6 and 13 are disengaged, the teeth 21 and 23 of the rings 18 and 22 are in engagement and the teeth 24 and 27 of the ring 22 and the collar 25 are disengaged. It will be understood that the parts are held in this position by the spring 29 bearing against the end portion of the ring 22. When it is desired to crank the engine the shaft 11 is pushed rearwardly, or to the left as the drawings are viewed, and the teeth 24 and 27 brought into engagement with each other. A further movement of the shaft will then bring the teeth 8 and 14 into engagement with each other and turning movement of the crank 34 will consequently rotate the engine shaft 5. Should the engine start forwardly, or in its proper direction, the engine shaft 5 will be rotated faster than the cranking shaft 11, and consequently the inclined sides of the teeth 8 and 14 will cause them to become disengaged, forcing back the handle and releasing the engine shaft. As soon as the handle is released the spring 29 will cause the parts to resume their normal position shown in Fig. 1. If, however, the engine should explode prematurely, and consequently start the shaft 5 rotating backwardly, this will lock the teeth 14 and 8 together, and start the shaft 11 rotating in a backward direction and consequently start the ring 22 carrying the teeth 23 in a backward rotation. This will immediately cause the rollers 20 in the cam grooves 19 of the ring 18 to clutch the bearing sleeve 16 and lock the ring 18, consequently a further rotary backward movement will force back the ring 22 which, through the collar 25, will release the teeth of the rings 6 and 13, consequently disengaging their clutch teeth and releasing the cranking shaft 11.

As soon as the handle is released after the cranking shaft has stopped the spring 29 will cause the teeth 24 and 27 to disengage and the teeth 21 and 23 to again engage and restore the parts to their normal position shown in Fig. 1 and ready to again crank the engine.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

In a cranking mechanism for hydrocarbon engines the combination with a clutch member fast on the engine shaft, of a rotatably mounted endwise movable starting shaft carrying a coöperative clutch member, a stationary bearing sleeve in which the cranking shaft is mounted, a ring surrounding the sleeve, clutching mechanism adapted to lock the ring from rotation on the sleeve in one direction only, clutch teeth formed on the ring, a second ring loosely mounted on the cranking shaft, said ring being provided with clutch teeth adapted to engage the clutch teeth of the first ring, a spring surrounding the cranking shaft and adapted to normally hold the teeth of the clutch rings in engagement with each other, a collar fast on the crank shaft and said collar and second-mentioned ring being provided with coöperating clutch members, for the purpose described.

In testimony whereof I affix my signature in presence of two witnesses.

FRED DETTMAN.

Witnesses:
 F. H. REESE,
 CHAS. C. WOLAVER.

Copies of this patent may be obtained for five cents each, by addressing the "Commissioner of Patents, Washington, D. C."